UNITED STATES PATENT OFFICE.

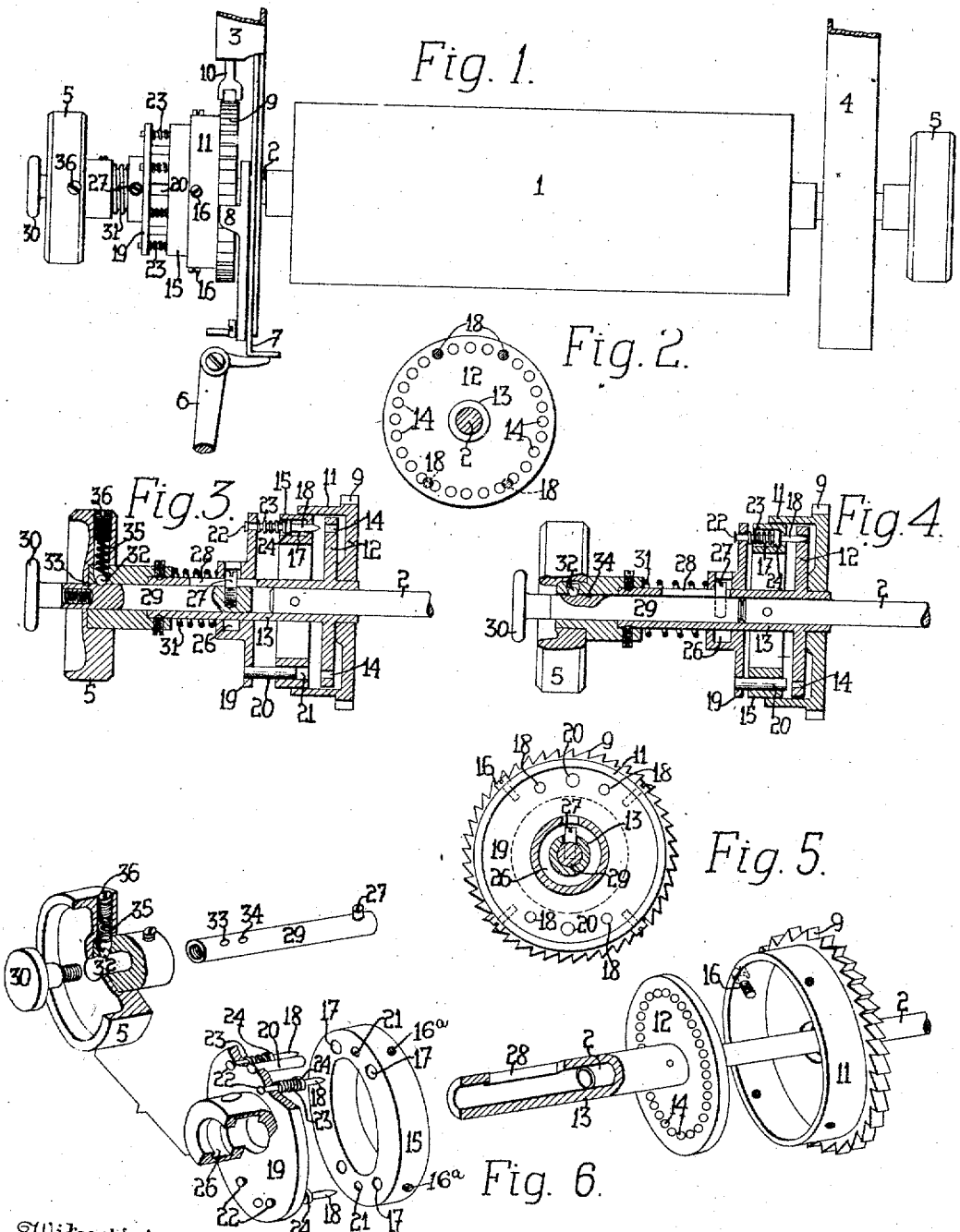

RICHARD W. UHLIG, OF RUTHERFORD, NEW JERSEY, ASSIGNOR TO UNDERWOOD TYPEWRITER COMPANY, OF NEW YORK, N. Y., A CORPORATION OF NEW JERSEY.

TYPE-WRITING MACHINE.

1,021,386.   Specification of Letters Patent.   Patented Mar. 26, 1912.

Application filed January 20, 1910. Serial No. 538,977.

*To all whom it may concern:*

Be it known that I, RICHARD W. UHLIG, a citizen of the United States, residing in Rutherford, in the county of Bergen and State of New Jersey, have invented certain new and useful Improvements in Type-Writing Machines, of which the following is a specification.

This invention relates to devices for releasably clutching the line-space wheel to the platen of a typewriting machine.

My invention is herein disclosed as applied to an Underwood typewriting machine in which a rotatable platen is mounted in a traveling frame.

One object of the present invention is to provide an improved and greatly simplified positive locking or clutch mechanism for releasably connecting the line-space wheel and the platen wherein the interlocking of the clutch members is rendered certain and direct, the mechanism being easily and quickly applicable to existing machines without changing other features thereof, and operated with ease and despatch.

It consists of but few parts readily assembled and disassembled, whereby its liability to get out of order is materially reduced.

The member of the clutch with which the line-space wheel is connected, comprises a bolt carrier in the form of a disk or annulus apertured to accommodate spring-pressed bolts or bayonets movable toward and from a clutch member fast on the platen axle and provided with a circular series of seats preferably evenly spaced in which the inner ends of one or more of the bolts are projected to positively lock the platen and line space wheel together. To insure the entry of one or more bolts into the seats of the fast clutch member, the bolts are arranged at unequal intervals from each other opposite the circular series of seats, so that in case one of the bolts does not register with its seat in the fast clutch member, one or more of the other bolts will. The bolts are withdrawn by a finger piece to permit independent adjustment of the platen relative to the line-space wheel.

In the accompanying drawings, Figure 1 is a plan view of this invention applied to the Underwood type of writing machine, and partly broken away to show the relation of the parts. Fig. 2 is a detail side view showing the relation of the bolts of the loose clutch member to the seats in the fast clutch member. Fig. 3 is a detail cross-sectional view showing the clutch released. Fig. 4 is a similar view showing the clutch in normal position. Fig. 5 is a detail cross sectional view taken at right angles to Figs. 3 and 4. Fig. 6 is a detail perspective view, partly broken away, showing the operative parts of the invention disassembled.

The usual platen 1 is fixed upon an axle 2 journaled in a platen frame, the ends of which are seen at 3, 4, a finger knob 5 being secured upon one end of the axle which projects from the platen frame, for rotating the platen.

Mechanical line-spacing of the platen is effected through a lever 6, slide 7, pawl 8 and line-space wheel 9, the latter loosely mounted relative to the platen. Said line-space wheel has the usual spring detent 10. Upon the line-space wheel 9 is formed an annular laterally-extending flange or rim 11, forming a drum surrounding a clutch member 12 in the shape of a disk fast on the axle, or on a tubular extension 13 thereof, said disk having a circular series of perforations or seats 14 arranged in close proximity to one another. These seats are arranged to be engaged by the ends of one or more bolts 18 mounted in a bolt carrier 15 fast to the line-space wheel. These bolts serve to positively lock the platen and line-space wheel together.

The bolt carrier 15 is fastened to the flange or rim 11 by screws 16, taking into holes 16ª in the bolt carrier, so that the bolt carrier practically constitutes a part of the rim 11 and line-space wheel 9. The carrier is apertured, as at 17, forming guideways for the bolts 18, which bolts may be projected to enter the seats 14 located in the adjacent clutch member 12.

The outer ends of the bolts are loosely engaged by a releasing head 19 capable of turning on and sliding longitudinally of the axle or its sleeve 13. Said releasing head has a guide pin 20 whose free end enters a hole 21 in the carrier 15 and guides the releasing head in its back and forth movement relative thereto. The extreme outer ends of the bolts are enlarged, as at 22, to be engaged by the releasing head, so that when the latter is drawn outward, it will withdraw the bolts from the seats 14 and free the platen from its line-space wheel and detent, thus permitting independent rotation of the platen. Springs 23 normally project the bolts into engagement with the clutch member 12, as seen in Fig. 4. The apertures in the bolt carrier are constricted at their inner ends to guide the bolts and prevent wabbling thereof. The remaining portion of said apertures is enlarged to enable the releasing head to compress the springs 23 therein when the parts are in normal position.

Since the seats 14 are preferably evenly spaced, it follows that if the bolts are similarly arranged, it might happen that the inner ends of the bolts 18 might all rest on the septums between the seats 14 and fail to lock the line-space wheel and platen together. To avoid such a contingency, the bolts 18 are arranged at unequal intervals (see Fig. 2) and the ends which enter the seats 14 are pointed, so that if one bolt strikes the member 12 between the seats 14, another bolt will engage with and enter some one of said seats.

The releasing head is operated by a central stem 29 sliding back and forth in the tubular extension 13 on axle 2. Said stem projects beyond the finger knob 5 and terminates in a button 30 for manipulating the clutch. When the button 30 is pulled outward, as in Fig. 3, a bit 27 on its stem 29, which projects through a slot 28 in the axle into an internal groove 26 (see Fig. 6) in the releasing-head, operates to pull the releasing head 19 away from clutch member 12, and draws the bolts 18 from their seats 14. This permits the platen 1 to be turned independently of the line-space wheel 9. A spring 31 returns the releasing head 19 to normal position, Fig. 4, thereby compressing the seating springs 23 to project one or more of the bolts into the seats of the clutch member 12 and hold them there. A latch comprising a check 32 to enter one or the other of a pair of recesses 33, 34 in the stem 29, will hold the releasing head 19 and with it the bolts in one or the other of their extreme positions. Said check is pressed against the stem by a spring 35 in a seat in the finger knob 5, held in place by a screw 36.

Variations may be resorted to within the scope of the invention, and portions of the improvements may be used without others.

Having thus described my invention, I claim:

1. In a typewriting machine, the combination with a platen, of a clutch member fixed to turn therewith and having equally spaced seats, a bolt carrier relatively to which the platen turns, a line-space wheel attached to the bolt carrier, unequally spaced bolts mounted in the bolt carrier to lock the fixed clutch member thereto, a releasing head mounted for longitudinal and rotary movement relatively to the platen, springs interposed between the releasing head and the bolts to press the bolts toward the fixed clutch member, the bolts operated by the releasing head, and a finger piece connected with the releasing head to control the engagement and disengagement of the bolts.

2. In a typewriting machine, the combination with a platen, a line-space wheel relative to which the platen turns, line-space mechanism for operating the wheel, and a detent for the wheel, of a clutch mechanism for positively locking the platen and line-space wheel together, including a disk fixed to turn with the platen, and provided with a circular series of seats arranged closely together, a bolt carrier with which the line space wheel is connected, a plurality of spring-pressed unequally spaced bolts in the bolt carrier, mounted to move toward and from the disk, the inner ends of the bolts being pointed, and a finger piece with which the bolts are connected.

3. The combination with a platen, of an axle fast to said platen and fast to a disk which faces a line-space wheel for said platen, said line-space wheel being loose on said axle and carrying an annulus extending on the opposite side of said disk, pins extending parallel to said axle through said annulus and independently projectable into perforations in said disk to lock said disk to said line-space wheel, and a finger piece for operating said pins.

4. The combination with a platen, of an axle fast to said platen and fast to a disk which faces a line-space wheel for said platen, said line-space wheel being loose on said axle and carrying an annulus extending on the opposite side of said disk, pins extending parallel to said axle through said annulus and independently projectable into perforations in said disk to lock said disk to said line-space wheel, and a guide for the rear end of said pins holding them rigidly parallel to said axle.

5. The combination with a platen, of an axle fast to said platen and fast to a disk which faces a line-space wheel for said platen, said line-space wheel being loose on said axle and carrying an annulus extending on the opposite side of said disk, pins extending parallel to said axle through said annulus and independently projectable into perforations in said disk to lock said disk to said line-space wheel, a guide for the rear end of said pins holding them rigidly parallel to said axle, a finger piece for operating said pins, and a detent holding said finger piece.

RICHARD W. UHLIG.

Witnesses:
RALPH S. WARFIELD,
JOHN O. SEIFERT.